United States Patent [19]

Schwartz

[11] 3,984,735

[45] Oct. 5, 1976

[54] THERMALLY RESPONSIVE CONTROL FOR A VACUUM CLEANER MOTOR

[75] Inventor: Östen Schwartz, Varmdo, Sweden

[73] Assignee: Aktiebolaget Electrolux, Stockholm, Sweden

[22] Filed: Apr. 2, 1975

[21] Appl. No.: 564,228

[30] Foreign Application Priority Data

Apr. 19, 1974 Sweden ............................ 7405287

[52] U.S. Cl. ............................ 317/13 C; 317/40 R; 317/13 B; 337/54; 337/90; 337/367; 15/339

[51] Int. Cl.[2] ............................ H02H 7/08

[58] Field of Search .............. 317/13 C, 13 B, 40 R, 317/13 A, 13 R; 337/54, 55, 90, 91, 366, 367, 368, 134, 344; 335/141, 144, 145; 318/473, 471, 472, 221 C, 221 H; 15/339, 412, DIG. 11

[56] References Cited

UNITED STATES PATENTS

| | | | |
|---|---|---|---|
| 2,213,890 | 9/1940 | Schaefer | 337/366 |
| 2,322,235 | 6/1943 | Howard | 337/90 |
| 2,323,266 | 6/1943 | Wilson | 335/144 |
| 2,519,025 | 8/1950 | Crise | 337/366 |
| 2,570,222 | 10/1951 | Ell | 15/412 |
| 2,729,717 | 1/1956 | Visos | 337/54 |
| 3,200,274 | 8/1965 | Munier | 317/13 C |
| 3,207,877 | 9/1965 | Chinn | 337/366 |
| 3,600,635 | 8/1971 | Neilson | 317/13 C |

*Primary Examiner*—J D Miller
*Assistant Examiner*—Patrick R. Salce
*Attorney, Agent, or Firm*—Alfred E. Miller

[57] ABSTRACT

A control unit for an electric motor in a vacuum cleaner which stops the motor when the motor temperature exceeds a certain level. The control unit is utilized with a vacuum cleaner having a low voltage circuit for controlling the motor speed and is simple and inexpensive, as well as safe in operation.

8 Claims, 3 Drawing Figures

THERMALLY RESPONSIVE CONTROL FOR A VACUUM CLEANER MOTOR

BACKGROUND OF THE INVENTION

In known control devices means sensitive to the operating temperature of the motor act upon a valve which, when the motor temperature exceeds a certain level, uncovers an opening through which outside atmospheric air is supplied to the motor-fan unit. Thus, air is conveyed directly to the fan without first passing through the dust container. In this construction and arrangement, the motor is cooled to a normal operating temperature, whereby the risk of overloading and overheating of the motor is eliminated. However, this device is relatively complex and expensive to manufacture. Furthermore, there is a sensing means arranged in the circuit of the motor for turning the motor off when it is operating at too high a temperature. Due to present safety regulations, this solution is also expensive.

SUMMARY OF THE INVENTION

This invention relates to a device located in a vacuum cleaner in which at least one fan driven by the vacuum cleaner electric motor transports dust-laden air through a dust separating filter in which in the proximity of the electric motor a temperature sensing means is arranged to switch the motor off when a temperature exceeding a predetermined temperature is reached.

An object of the present invention is to provide a control means for a vacuum cleaner motor that is simple, safe to use, and inexpensive to manufacture.

It is another object of the present invention to provide a device for turning the motor off at a temperature above a predetermined level which is considerably simpler in construction than in other known devices.

A further object of the present invention is to provide a control means for a vacuum cleaner motor having a temperature sensing unit that is built into a low voltage control circuit of the motor.

The invention will now be more fully described with reference to the accompanying drawings, in which.

DESCRIPTION OF THE PREFERRED EMBODIMENT

Figure 1:
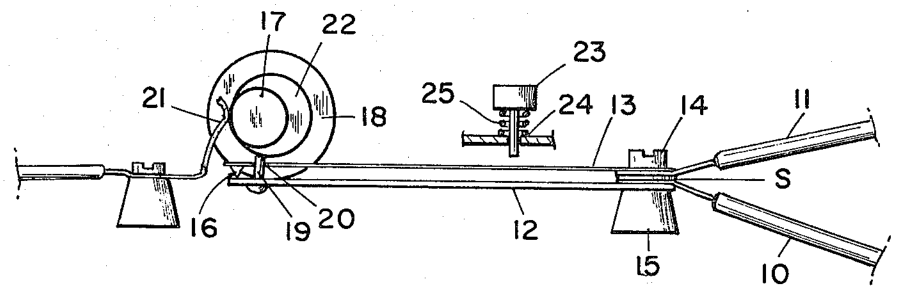
FIG. 1 is a schematic view in elevation showing the control circuit constructed and arranged in accordance with the teachings of my invention, but in a closed condition.

Two wires 10 and 11 of the low voltage control circuit (not shown) are connected respectively to the bimetallic element 12 and the steel spring 13. It will be observed that the spring 13 is located above and generally parallel to the bimetallic element 12 and that both the bimetallic element and the spring at one end thereof on a post 15 by means of a screw 14. It will be noted that an insulating member S is positioned between the spring and bimetallic element. The post 15 is located in proximity to the vacuum cleaner motor (not shown). The steel spring 13 at its free end is provided with a contact member 16 which, under normal operating conditions, makes contact with the adjacent free end of the bimetallic element 12, as shown in FIG. 1. In this condition, the electric circuit goes from the wire

10, through the bimetallic element 12, the contact member 16 and the steel spring 13 to the wire 11.

A permanent magnet 17 is shown located adjacent to but above the spring 13. The magnet is in the form of a cylinder that is eccentrically mounted relative to the axis of rotation of the adjusting knob 18. Accordingly, by turning the knob 18, the vertical distance between the steel spring 13 and the magnet cylinder 17 can be continuously varied.

When the present device is operated and the motor temperature increases, for example, due to the clogging of the dust container, the bimetallic element 12 commences to bend slowly upwardly toward the direction of the steel spring 13. At a given distance from the magnet cylinder 17 the steel spring 13 snaps instantaneously over into contact with the cylinder 17 and assumes the position shown in FIG. 2.

Figure 2:
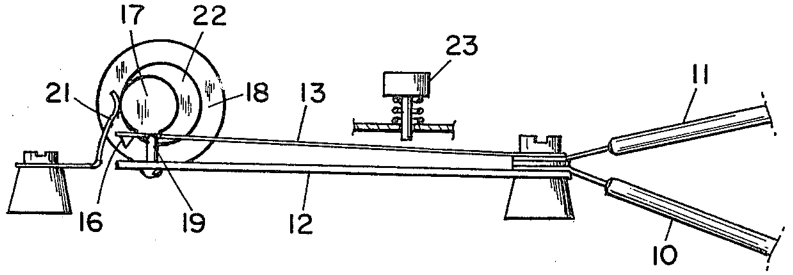
FIG. 2 is a view similar to FIG. 1 in which the control circuit is in an open condition.
Figure 3:
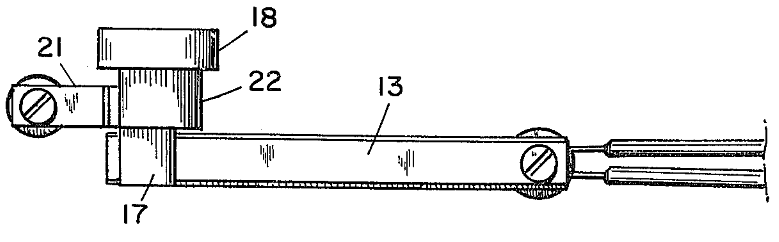
FIG. 3 is a top view of the temperature sensing means of the present device.

An insulated separator pin 19, as shown in FIGS. 1 and 2, prevents the bimetallic element 12 from following the movement of the steel spring 13 upon continued heating and subsequent contact with the spring by means of the contact member 16. The pin 19 is fixed in an upstanding position to the free end of the bi-metallic element 12. The pin 19 extends past the steel spring 13, or in the alternative, through an opening in the spring to engage the cylinder 17. As the bimetallic element 12 continues to bend due to excess motor heat, the free end of the separator pin 19 bears against the cylinder surface. This arrangement functions to maintain the spring and the bimetallic element in spaced relationship. Finally, the electrical contact is broken and the motor is stopped by means of a control circuit (not shown).

In the above-described position the steel spring 13 may be allowed to connect to another electric circuit by means of a resilient contact 21. It will be apparent that the free end of resilient contact 21 engages with the cylinder surface 22 that is in turn co-axially arranged with the adjusting knob 18. The other end of the resilient contact 21 is attached to a wire (not shown) that is electrically connected, for example, to a visual warning lamp that indicates when the motor has stopped and that the dust bag requires changing.

The time interval for changing dust bags can be preset by means of the adjusting knob 18. It should be evident that by rotating the knob, the distance between the steel spring 13 and the magnet cylinder 17 can be changed to the desired setting. Consequently, at greater distances, a stronger impulse from the bi-metallic element to the steel spring is required in order to cause the steel spring 13 to snap over into engagement with the surface of the cylinder 17. In other words, a higher degree of clogging of the dust container is permitted resulting in a higher motor temperature before the spring 13 performs its snapping movement. The magnet cylinder 17 is provided with a scale having indicia on the periphery of the cylinder, and the sensing means may be adjusted to turn the motor off at different high motor temperatures.

As seen in FIGS. 1 and 2, the steel spring 13 may be returned to its original position by depressing the return knob 23 provided with a pin 24 and an helical spring 25. Thus, after the bi-matallic element 12 has cooled down and resumed its initial rest position, the spring-loaded return knob 23, being adjacent to the steel spring 13, is depressed so that the pin 24 engages the spring and forces the latter into contact with the bi-metallic element. The temperature sensing device is then in position for resuming its function in connection with the vacuum cleaner apparatus.

A low voltage control circuit for controlling the motor speed of a vacuum cleaner is set forth in detail in Swedish Pat. No. 363,941, and corresponding U.S. Pat. No. 3,855,665, issued Dec. 24, 1974.

What is claimed is:

1. In a thermally responsive control for a vacuum cleaner motor having a low voltage control circuit and provided with at least one fan, driven by said motor and a dust separating filter, said fan upon operation of said motor conveying the dust-laden air through said filter, the improvement comprising: a temperature sensing means located in proximity to said electric motor which automatically switches off said motor when the motor temperature exceeds a given level, said temperature sensing means being provided with a bimetallic element and a metallic spring, the latter having an opening therethrough and under normal operating conditions making electrical contact with said bimetallic element, said temperature sensing means further comprising a magnet which functions to break the contact between said metallic spring and the bimetallic element when the latter bends due to an increased motor temperature, an electrically insulated separator pin connected to the free end of said bimetallic element and extending through said opening in said metallic spring toward said magnet, and said temperature sensing means being built into said low voltage control circuit of the motor.

2. The temperature sensing means as claimed in claim 1 wherein the distance between the magnet and the metallic spring is variable.

3. The temperature sensing means as claimed in claim 2 wherein said magnet is a permanent magnet in the shape of a cylinder, and a rotatable adjusting knob, said magnet being eccentrically mounted relative to said adjusting knob.

4. The temperature sensing means as claimed in claim 1 further comprising a contact member located at the free end of said metallic spring which is adapted to make said contact with the bimetallic element under normal operating conditions.

5. The temperature sensing means as claimed in claim 1 wherein the length of said separator pin exceeds the length of the contact member when electrical contact is made between said metallic spring and said bimetallic element.

6. The temperature sensing means as claimed in claim 5 further comprising another low voltage circuit including a warning lamp and wherein said metallic spring and said magnet are built into said other low voltage circuit for lighting a warning lamp when the contact between said bimetallic element and said metallic spring is broken.

7. The temperature sensing means as claimed in claim 1 further comprising a spring-biased return knob having a pin arranged adjacent to said metallic spring, said knob being pressed to engage the metallic spring by means of its pin to bring said spring into electrical contact with said bimetallic element.

8. In a thermally responsive control for a vacuum cleaner motor having a low voltage control circuit and provided with at least one fan, driven by said motor and a dust separating filter, said fan upon operation of said motor conveying the dust-laden air through said filter, the improvement comprising: a temperature sensing means located in proximity to said electric motor which automatically switches off said motor when the motor temperature exceeds a given level, said temperature sensing means being provided with a bimetallic element and a metallic spring, the latter under normal operating conditions making electrical contact with said bimetallic element, said temperature sensing means further comprising a magnet which functions to break the contact between said metallic spring and the bimetallic element when the latter bends due to an increased motor temperature, an electrically insulated separator pin connected to the free end of said bimetallic element and extending adjacent to said metallic spring with the end thereof juxtaposed to said magnet, and said temperature sensing means being built into said low voltage control circuit.

* * * * *